United States Patent
Yoon et al.

(10) Patent No.: US 6,947,197 B2
(45) Date of Patent: *Sep. 20, 2005

(54) MICROMIRROR ACTUATOR

(75) Inventors: Yong-seop Yoon, Seoul (KR); Young-hoon Min, Anyang (KR); Ki-deok Bae, Yongin (KR)

(73) Assignee: Samsung Electronics Co., Ltd. (KR)

(*) Notice: Subject to any disclaimer, the term of this patent is extended or adjusted under 35 U.S.C. 154(b) by 621 days.

This patent is subject to a terminal disclaimer.

(21) Appl. No.: 10/015,953

(22) Filed: Dec. 17, 2001

(65) Prior Publication Data

US 2004/0246558 A1 Dec. 9, 2004

(30) Foreign Application Priority Data

May 12, 2001 (KR) .......................... 2001-25984

(51) Int. Cl.[7] .............................................. G02B 26/00
(52) U.S. Cl. ...................................... 359/291; 359/198
(58) Field of Search ................................ 359/291, 292, 359/295, 223, 224, 214, 198, 199, 237, 230, 849; 257/415; 385/18

(56) References Cited

U.S. PATENT DOCUMENTS 6,519,075 B2 * 2/2003 Carr et al. .................. 359/291
6,791,742 B2 * 9/2004 Staker et al. ............... 359/291

* cited by examiner

Primary Examiner—Scott J. Sugarman
Assistant Examiner—Richard Hanig
(74) Attorney, Agent, or Firm—Sughrue Mion, PLLC

(57) ABSTRACT

A micromirror actuator having a micromirror, which is operative using an electrostatic force with a low voltage and wherein an electrostatic force opposite to the driving force of the micromirror is blocked, and a method for manufacturing the same, are provided. The micromirror actuator includes a substrate, a trench in which at least one electrode is formed, supporting posts installed at opposite sides of the trench, a torsion bar supported by the supporting posts, and the micromirror including a driving unit which faces the trench when the micromirror is in a horizontal state, and a reflecting unit, which is elastically rotated about the torsion bar, to reflect an optical signal. The actuator also includes a shielding electrode installed to face the reflecting unit when the micromirror is in a horizontal state and to block an electrostatic force occurring between the reflecting unit and the electrode.

17 Claims, 7 Drawing Sheets

MICROMIRROR ACTUATOR

BACKGROUND OF THE INVENTION

1. Field of the Invention

Apparatuses and methods consistent with the present invention relate to a micromirror actuator and a method of manufacturing the same and, more particularly, to a micromirror actuator having a micromirror, which is made to rise to a precisely vertical state or is maintained in a horizontal state using an electrostatic force with a low voltage and wherein an electrostatic force opposite to the driving force of the micromirror is blocked, and a method of manufacturing the same.

2. Description of the Related Art

Generally, optical switches are capable of selecting an optical route and thus allowing an optical signal to be transmitted from an input terminal to a predetermined output terminal. Referring to FIG. 1, a conventional optical switch comprises a plurality of micromirror actuators 10 arranged in a two-dimensional matrix. Light emitted from an optical fiber 43 of an input unit is collimated into a parallel beam through a micro lens 45 which is a focal distance apart from the optical fiber 43. The parallel beam is incident upon a corresponding one of vertically oriented micro mirrors 31a, 31b, 31c and 31d and then is reflected. The reflected parallel beam enters an output unit, passes through a micro lens 46, and is transmitted to an optical fiber 48 of an output unit. Such an optical switch is capable of selecting an optical route by reflecting an incident optical signal using vertically oriented micromirrors 31a through 31d and letting an incident optical signal pass over horizontally oriented micromirrors 32. For example, as shown in FIG. 1, the micromirror 31a placed at the first row from the top and the fourth column from the left, the micromirror 31b placed at the second row from the top and the third column from the left, the micromirror 31c placed at the third row from the top and the first column from the left, and the micromirror 31d placed at the fourth row from the top and the second column from the left are made to stand vertically and the other micromirrors 32 are maintained to be horizontal, thereby transmitting an optical signal via a desired optical route.

FIG. 2 illustrates a conventional micromirror actuator 10 taking advantage of electrostatic force. Referring to FIG. 2, a trench 5 is formed in a substrate 15, and supporting posts 20 stand straight at opposite ends of the trench 5. A torsion bar 25 is supported by the supporting posts 20, and a micromirror 30 is coupled to the torsion bar 25 so as to be capable of rotating but elastically biased to a horizontal state. The micromirror 30 is comprised of a driving unit 30a, which faces the trench 5 when the micromirror 30 is in a horizontal state, and a reflecting unit 30b opposite to the driving unit 30a with the torsion bar 25 formed therebetween.

FIG. 3 is a cross-sectional view of the conventional micromirror actuator 10 taken along the line 3—3 in FIG. 2. Referring to FIG. 3, a lower electrode 37 is installed at the bottom of the trench 5 and a side electrode 40 is installed at one sidewall of the trench 5. The micromirror 30 is driven by an electrostatic force induced by interaction between the lower and side electrodes 37 and 40 and the driving unit 30a. In other words, if an attractive electrostatic force acts between the lower electrode 37 and the driving unit 30a, the micromirror 30 rotates clockwise about the torsion bar 25. As the micromirror 30 rotates, an attractive electrostatic force between the driving unit 30a and the side electrode 40 increases in strength causing the micromirror 30 to continue rotating until it stands vertically. After the electrostatic driving force is removed, the micromirror 30 is restored to a horizontal state due to the elastic restoring force of the torsion bar 25.

In this case, an electrode surface, upon which an electrostatic force acts, is formed on the whole micromirror 30. Thus, if voltage is applied to the micromirror 30, an electrostatic force acts between the driving unit 30a and the lower and side electrodes 37 and 40 and between the reflecting unit 30b and the lower and side electrodes 37 and 40. The distance from the reflecting unit 30b to the lower and side electrodes 37 and 40 is greater than the distance from the driving unit 30a to the lower and side electrodes 37 and 40; however, the substrate 15 is formed of silicon and the dielectric constant of silicon is at least 10 times greater than the dielectric constant of air. Thus, an electrostatic force can be strongly exerted between the reflecting unit 30b and the side and lower electrodes 40 and 37 through the silicon substrate 15.

Accordingly, if the electrostatic force between the driving unit 30a and the side and lower electrodes 40 and 37 is referred to as f1 and the electrostatic force between the reflecting unit 30b and the side and lower electrodes 40 and 37 is referred to as f2, an electrostatic force f3 actually contributing to driving the micromirror 30 is equal to f1–f2. In other words, when driving the micromirror 30 through the driving unit 30a, the electrostatic force introduced by interaction between the reflecting unit 30b and the side and lower electrodes 40 and 37 acts upon the micromirror 30 in a direction opposite to the direction of the driving force of the micromirror 30, and thus the driving force introduced by the driving unit 30a is inhibited. As a result, a driving voltage required to drive the micromirror 30 increases, and it is difficult to control the micromirror 30 to stand precisely vertically because of the opposite electrostatic force introduced by the reflecting unit 30b.

SUMMARY OF THE INVENTION

To solve the above-described problems, it is an aspect of the present invention to provide a micromirror actuator including a shielding electrode for preventing generation of an electrostatic force opposed to a driving force of a micromirror, which can be raised precisely vertically, and thus driving the micromirror using a smaller driving force.

Accordingly, to achieve the above aspect of the present invention, there is provided a micromirror actuator including a substrate, a trench in which at least one electrode is formed, supporting posts installed at opposite sides of the trench, a torsion bar supported by the supporting posts, a micromirror including a driving unit which faces the trench when the micromirror is in a horizontal state, and a reflecting unit which is elastically rotated about the torsion bar to reflect an optical signal; and a shielding electrode installed to face the reflecting unit when the micromirror is in the horizontal state and to block an electrostatic force occurring between the reflecting unit and the at least one electrode.

Preferably, but not necessarily, the shielding electrode is formed to be in an equipotential state with the reflecting unit.

Preferably, but not necessarily, a slit is formed at a predetermined portion of the reflecting unit of the micromirror.

To achieve the above aspect of the present invention, there is provided a method of manufacturing a micromirror actuator including forming a trench pattern in a substrate, forming a lower electrode and a side electrode in the trench pattern and forming a shielding electrode on a surface of the substrate outside the trench pattern by sequentially depositing an insulating layer and a metal layer on the substrate and etching the metal layer, depositing a sacrificial layer to a predetermined thickness on the surface of the substrate including the trench pattern, forming holes for supporting posts by etching a predetermined portion of the sacrificial layer, depositing a further metal layer on the sacrificial layer and patterning the further metal layer into a micromirror, a torsion bar, and supporting posts, and forming the micromirror, the torsion bar, and the supporting posts by removing the sacrificial layer.

In the step of depositing the sacrificial layer, photoresist is preferably, but not necessarily, deposited on the substrate and then is planarized by chemical mechanical polishing.

The step of depositing the sacrificial layer includes forming a photoresist pattern having a width greater than the trench pattern by depositing a first photoresist on the substrate and etching the first photoresist, flowing and hard-baking the photoresist pattern at a high temperature, thinly ashing the photoresist pattern, and depositing a second photoresist to a predetermined thickness on the substrate including the photoresist pattern.

The step of depositing the sacrificial layer further includes laminating a film type organic layer on the substrate so as to make the trench pattern hollow.

BRIEF DESCRIPTION OF THE DRAWINGS

The above aspects and advantages of the present invention will become more apparent by describing in detail illustrative, non-limiting embodiments thereof with reference to the accompanying drawings, in which.

DETAILED DESCRIPTION OF ILLUSTRATIVE EMBODIMENTS OF THE INVENTION

Figure 1:
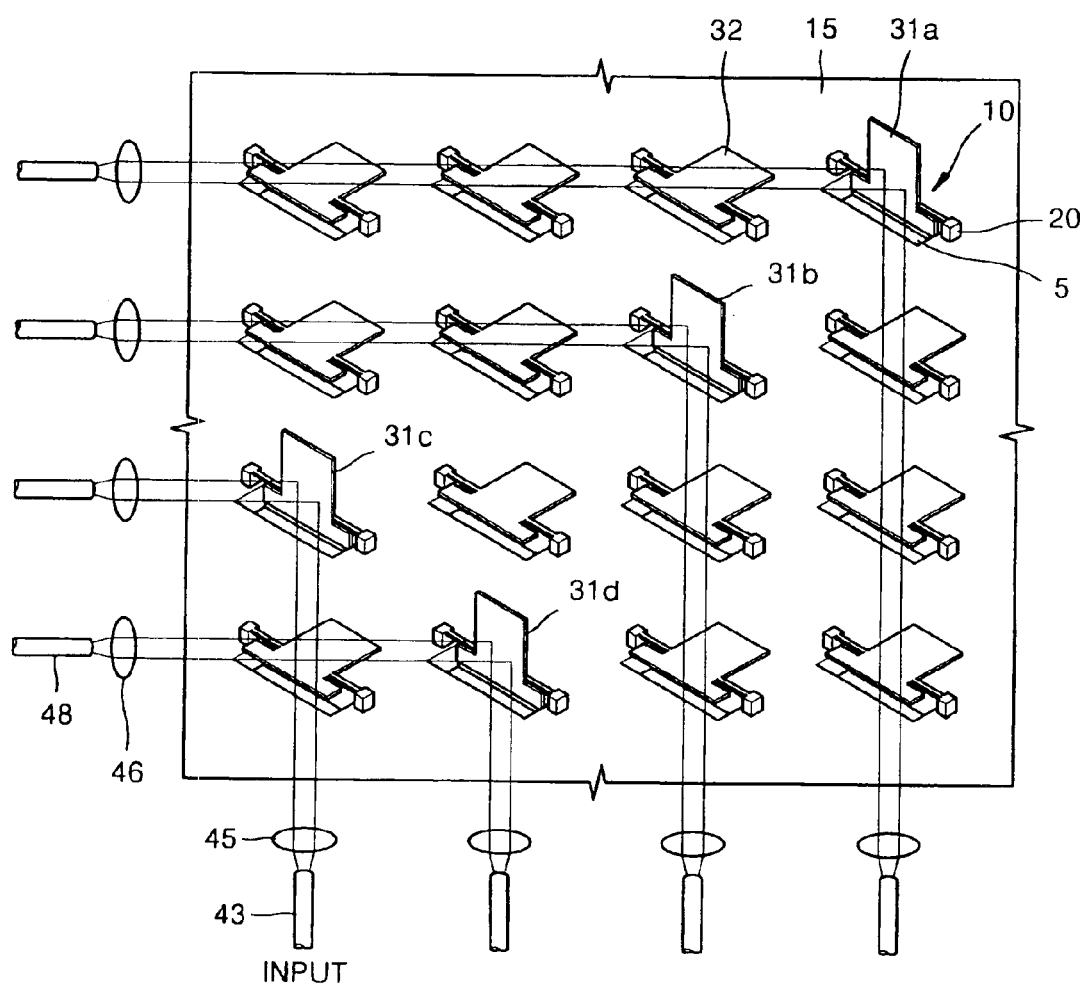
FIG. 1 is diagram illustrating an optical switch comprising a plurality of conventional micromirror actuators arranged in a matrix type.
Figure 2:
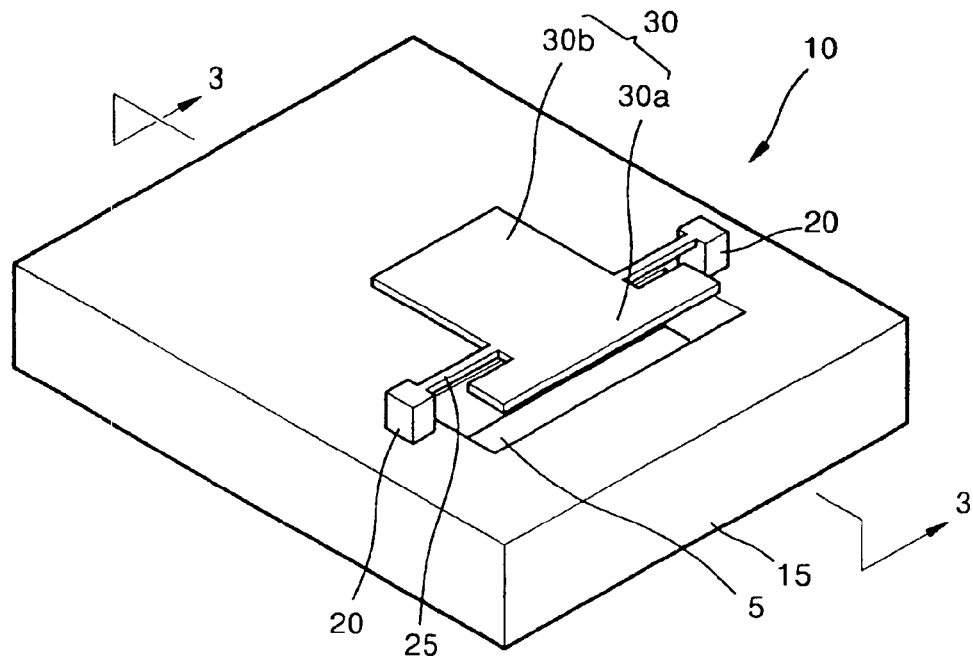
FIG. 2 is a perspective view of a conventional micromirror actuator.
Figure 3:
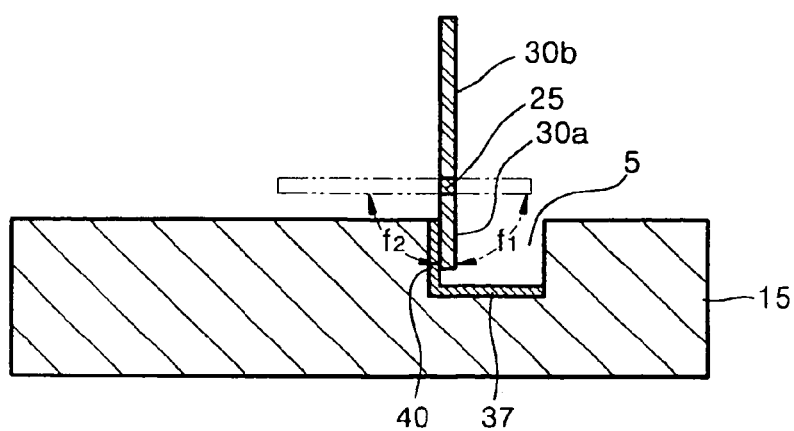
FIG. 3 is a cross-sectional view of the conventional micromirror actuator taken along the line 3—3 in FIG. 2.
Figure 4:
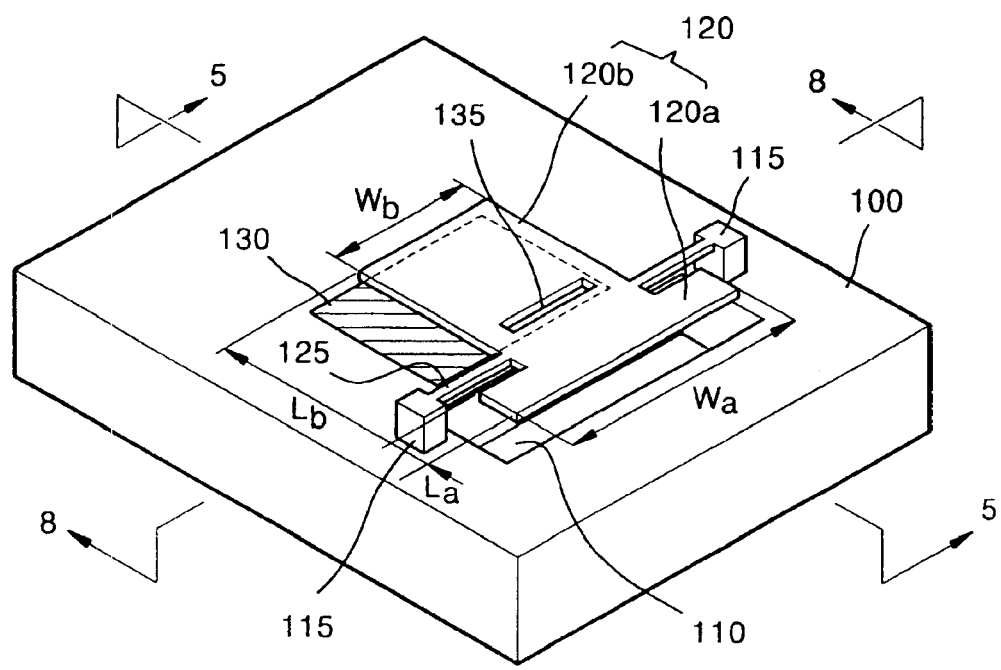
FIG. 4 is a perspective view of a micromirror actuator according to the present invention.
Figure 5:
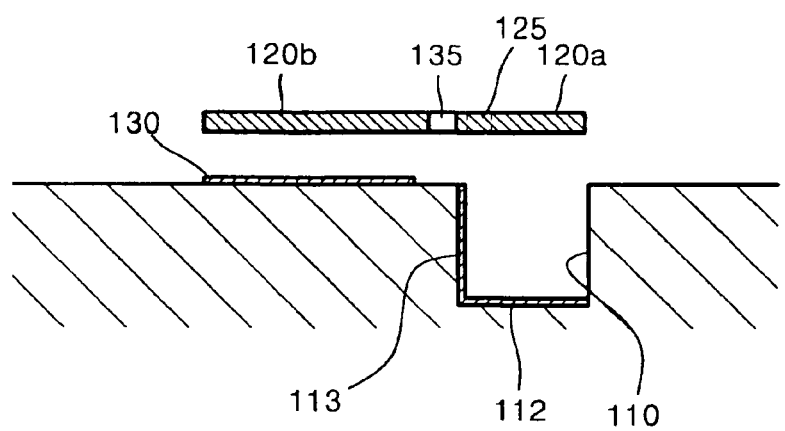
FIG. 5 is a cross-sectional view of the micromirror actuator according to the present invention taken along the line 5—5 in FIG. 4.

Referring to FIGS. 4 and 5, a micromirror actuator according to an illustrative, non-limiting embodiment of the present invention includes a substrate 100, a trench 110 formed in the substrate 100, a pair of supporting posts 115 formed at both sides of the trench 110, a micromirror 120 installed to be capable of rotating so as to reflect or pass an optical signal emitted from a light source (not shown), a torsion bar 125 supported by the supporting posts 115 and coupled with the micromirror 120 so as to elastically rotate the micromirror 120, and a shielding electrode 130 installed to face a portion of the micromirror when the micromirror 120 is in a horizontal state.

In the trench 110, at least one electrode used to drive the micromirror 120 is provided. For example, a lower electrode 112 and a side electrode 113 may be provided at the bottom and sidewall of the trench 110, respectively. The micromirror 120 can be rotated by an electrostatic force and includes a driving unit 120a, which faces the lower electrode 112 when the micromirror 120 is in a horizontal state, and a reflecting unit 120b, which reflects an optical signal. The micromirror 120 can reflect an optical signal and act as an electrode at the same time. The driving unit 120a generates an electrostatic force through interaction with the lower electrode 112, and then the driving unit 120a is drawn toward the lower electrode 112 due to the electrostatic field. As a result, the micromirror 120 rotates about the torsion bar 125. Then the micromirror 120 continuously rotates owing to interaction between the driving unit 120a and the side electrode 113 until the micromirror 120 stands vertically.

In order to reduce the stroke swept out by rotation of the driving unit 120a, the driving unit 120a and the reflecting unit 120b are preferably, but not necessarily, formed to be asymmetrical. In other words, as shown in FIG. 4, the length $L_a$ of the driving unit 120a is smaller than the length $L_b$ of the reflecting unit 120b, and the width $W_a$ of the driving unit 120a is greater than the width $W_b$ of the reflecting unit 120b. If the driving unit 120a and the reflecting unit 120b are formed to be asymmetrical, it is possible to reduce the stroke swept out by rotation of the driving unit 120a when the micromirror 120 rotates and thus decrease a driving voltage required to drive the micromirror 120. Imbalance between the driving unit 120a and the reflecting unit 120b caused by the fact that the length $L_a$ of the driving unit 120a is smaller than the length $L_b$ of the reflecting unit 120b, can be compensated for by appropriately adjusting the width $W_a$ of the driving unit 120a and the width $W_b$ of the reflecting unit 120b, as described above.

When the micromirror 120 stands vertically, the driving unit 120a contacts with the sidewall of the trench 110 and is supported by the sidewall of the trench 110. Thus, the micromirror 120 can be maintained to stand precisely vertically.

The shielding electrode 130 is installed on a predetermined portion of the substrate 100, which faces the reflecting unit 120 when the micromirror 120 is level with the surface of the substrate 100. In other words, the shielding electrode 130 is installed on a path, where an electrostatic force between the reflecting unit 120b and the lower electrode 112 or the side electrode 113 may occur and thus prevents an electrostatic force from occurring between the reflecting unit 120b and the lower electrode 112 or the side electrode 113.

For example, it is possible to prevent an electrostatic attractive force from working between the reflecting unit 120b and the lower or side electrode 112 or 113 by applying voltage to the shielding electrode 130 to be in an equipotential state with the reflecting unit 120b. Accordingly, it is possible to prevent an electrostatic force between the driving unit 120a and the side and lower electrodes 113 and 112 from being decreased due to an opposite electrostatic force introduced by interaction between the reflecting unit 120b and the side or lower electrodes 113 or 112.

In order to minimize the influence of an electrostatic force opposite to the driving force of the driving unit 120a, a slit 135 is preferably formed at a predetermined portion of the micromirror 120. The slit 135 maximizes the driving force of the driving unit 120a by preventing the occurrence of an electrostatic force which cannot be completely blocked by the shielding electrode 130. The slit 135 is preferably, but not necessarily, formed at a portion of the micromirror 120 which is not affected by the action of the shielding electrode 130 and does not affect the driving unit 120a generating an electrostatic force. In other words, an electrostatic force introduced by interaction between the reflecting unit 120b and the side or lower electrode 113 or 112 may not be completely blocked by the shielding electrode 130 and may work in an opposite direction to the electrostatic force of the driving unit 120a. As described above, it is possible to prevent the occurrence of an unwanted electrostatic force by forming the slit 135 at a predetermined portion of the micromirror 120 at which the shielding electrode 130 does not block the electrostatic force between the reflecting unit 120b and the side or lower electrode 113 or 112.

Also, the slit 135 must not be formed at a region of the micromirror 120 at which an optical signal is reflected by the reflecting unit 120. If so, the occurrence of an electrostatic force opposite to the electrostatic force of the driving unit 120a can be prevented through the shielding electrode 130 and then can be more completely prevented due to the existence of the slit 135. As a result, it is possible to effectively obtain a sufficient electrostatic force required of the driving unit 120a and precisely control the driving of the micromirror 120.

Hereinafter, a method of manufacturing a micromirror actuator according to the present invention will be described in detail.

Figure 6A:
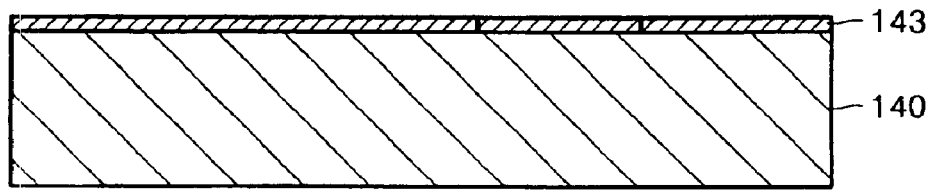
FIGS. 6A through 6G are cross-sectional views illustrating a method for manufacturing a micromirror actuator according to a first embodiment of the present invention.
Figure 6B:
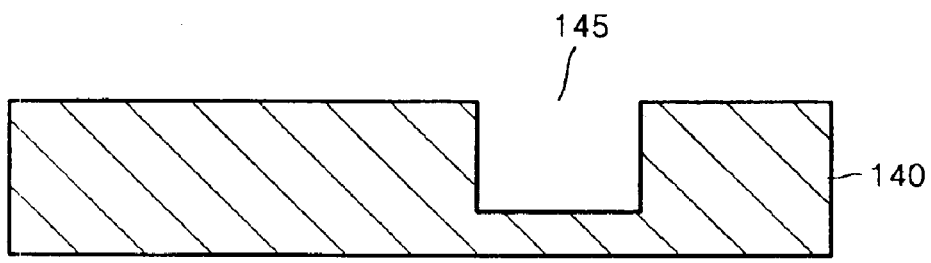

As shown in FIGS. 6A and 6B, a substrate 140 is covered with photoresist 143, a trench pattern 145 is formed by photolithography, and then the photoresist 143 is removed.

Figure 6C:
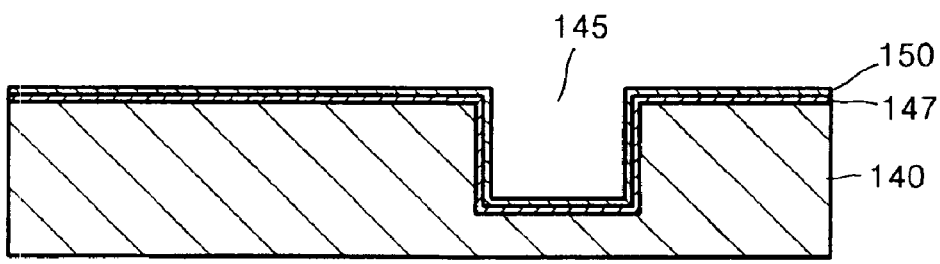
Figure 6D:
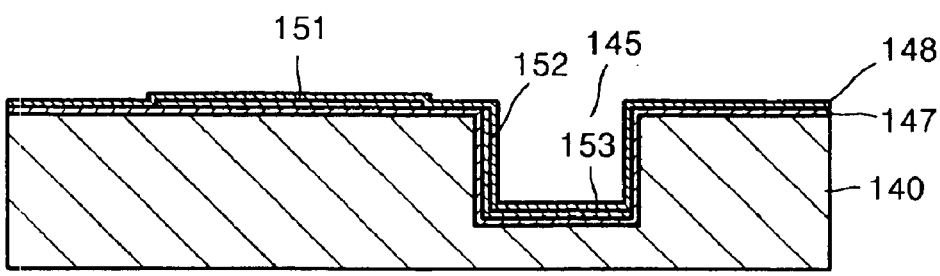

As shown in FIG. 6C, an insulating layer 147 and a metal layer 150 are deposited on the substrate 140 including the trench pattern 145. As shown in FIG. 6D, a shielding electrode 151, a side electrode 152, and a lower electrode 153 are formed by photolithography. Before patterning the shielding electrode 151, a region on which the shielding electrode 151 will be formed, must be determined first in order to prevent an unnecessary electrostatic force from occurring between a micromirror and the side and lower electrodes 152 and 153. Next, an insulating layer 148 is formed on the substrate 140 on which the shielding electrode 151, the side electrode 152, and the lower electrode 153 are formed to prevent a micromirror from contacting electrically. Next, a sacrificial layer is deposited to a predetermined thickness on the insulating layer 148.

Figure 6E:
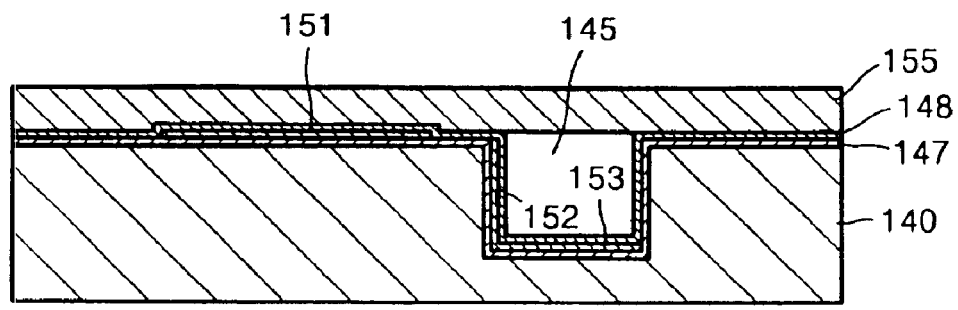
Figure 6F:
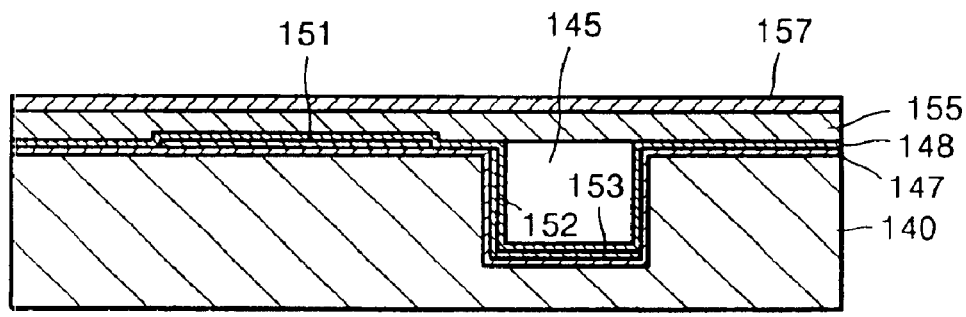

As illustrated in FIG. 6E, the deposition of the sacrificial layer on the insulating layer includes, for example, a step of laminating a commonly-used film type organic layer 155 by applying predetermined temperature and pressure to the organic layer 155. A distance between a micromirror and an electrode is strongly dependent on the thickness of the organic layer 155. As the distance between a micromirror and an electrode becomes narrower, a greater electrostatic force can be obtained from a predetermined voltage. Thus, it is preferable to thinly form the organic layer 155. The organic layer 155 may be thinly formed of a polyimide-based material. Alternatively, as shown in FIG. 6F, a thick organic layer 155 is laminated and then is dry-etched to be thin.

Figure 7A:
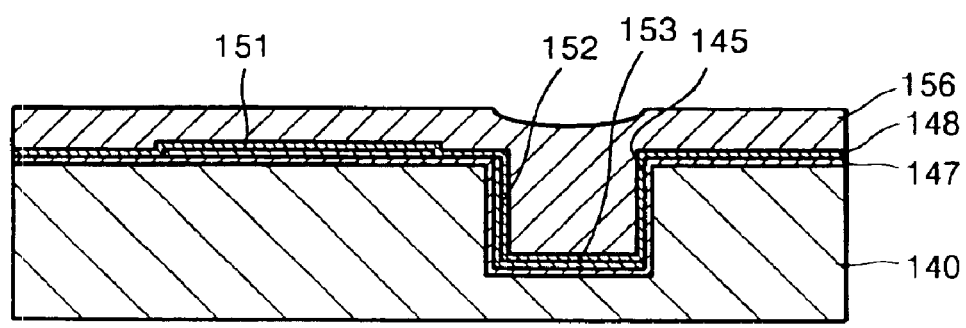
FIGS. 7A and 7B are cross-sectional views illustrating a method for manufacturing a micromirror actuator according to a second embodiment of the present invention.
Figure 7B:
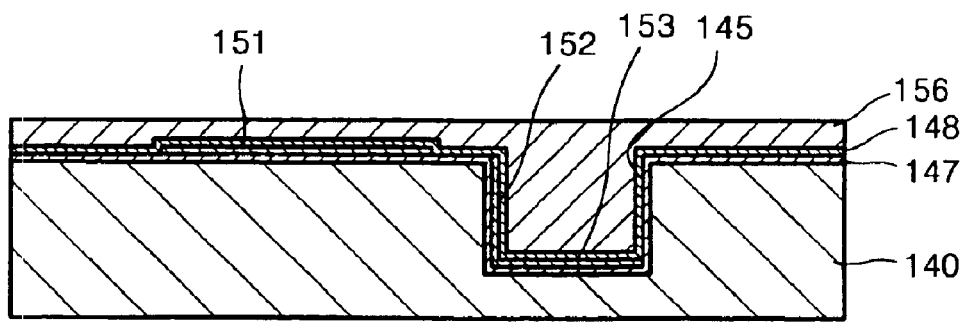

There is another method for depositing a sacrificial layer (for example, a photoresist 156) on the substrate 140. As shown in FIGS. 7A and 7B, the photoresist 156 is deposited on the substrate 140 including the shielding electrode 151, the side electrode 152, and the lower electrode 153 so as to fill the trench pattern 145. At this stage, the photoresist 156 may be slightly recessed on the trench pattern 145 due to a cushion effect. In due consideration of this phenomenon, the whole profile of the photoresist 156 is formed to be higher than the surface of the substrate. As shown in FIG. 7B, the photoresist 156 is planarized by chemical mechanical polishing or photoresist planarization. For planarizing the photoresist 156, the substrate is covered with a first photoresist and the photoresist is etched, thereby forming a photoresist pattern corresponding to the trench 110 and having a width greater than the trench pattern 145. Then, the photoresist pattern is flowed and hard-baked at a high temperature. Next, the photoresist pattern is thinly ashed and then a second photoresist is deposited to a predetermined thickness on the substrate 140 including the photoresist pattern.

Figure 6G:
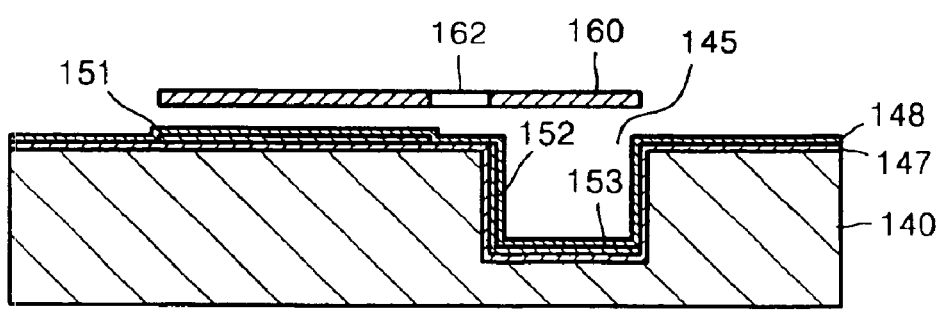
Figure 8A:
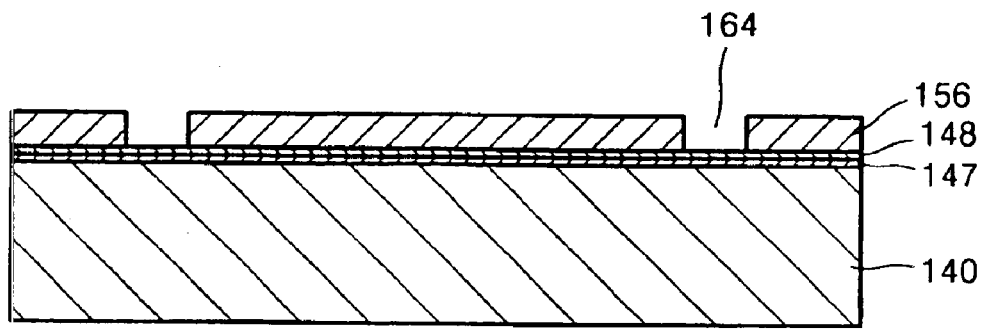
FIGS. 8A through 8C are cross-sectional views illustrating a method for manufacturing a micromirror actuator according to either the first or second embodiment of the present invention taken along the line 8—8 of FIG. 4.
Figure 8B:
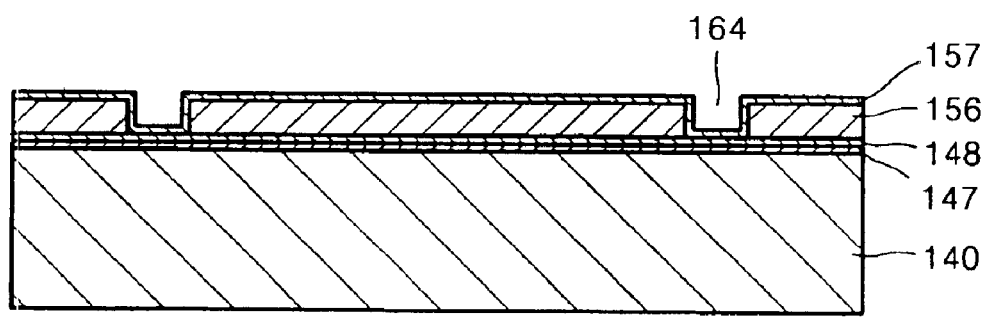
Figure 8C:
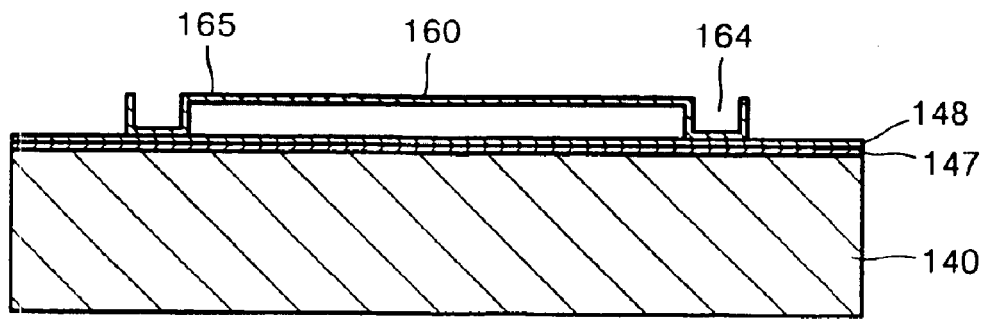

FIGS. 8A through 8C are cross-sectional views taken along the line 8—8 of FIG. 4. As shown in FIG. 8A, after forming the sacrificial layer 155 (or 156 in the case of the second embodiment of FIGS. 7A and 7B), a hole 164 for a supporting post is patterned. Next, as shown in FIGS. 6F and 8B, a metal layer 157 is deposited on the sacrificial layer 155 (or 156) and then a micromirror 160 and a torsion bar 165 are patterned through an etching process. At this time, an electrostatic force prevention slit 162 with the micromirror 160 and the torsion bar 165 is patterned at a predetermined portion of the micromirror 160. Next, as shown in FIGS. 6G and 8C, the sacrificial layer 155 (or 156) under the micromirror 160 is removed. The sacrificial layer 155 (or 156) may be removed by isotropic etching.

As described above, the micromirror actuator according to the present invention and the method of manufacturing the same include a shielding electrode for preventing the occurrence of an electrostatic force opposite to the driving force of a micromirror and thus can make the micromirror stand precisely vertically through the use of a smaller driving force. In addition, according to the present invention, since it is unnecessary to take the electrostatic force opposite to the driving force of the micromirror into consideration when driving the micromirror, it is easy to control the micromirror.

It is contemplated that numerous modifications may be made to the micromirror actuator and method of manufacturing the same of the present invention without departing from the spirit and scope of the invention as defined in the following claims.

What is claimed is:

1. A micromirror actuator comprising:
   a substrate;
   a trench in which at least one electrode is formed;
   supporting posts installed at opposite sides of the trench;
   a torsion bar supported by the supporting posts;
   a micromirror including a driving unit which faces the trench when the micromirror is in a horizontal state, and a reflecting unit which is elastically rotated about the torsion bar to reflect an optical signal; and
   a shielding electrode installed to face the reflecting unit when the micromirror is in the horizontal state and to block an electrostatic force occurring between the reflecting unit and the at least one electrode.

2. The micromirror actuator of claim 1, wherein the shielding electrode is formed to be in an equipotential state with the reflecting unit.

3. The micromirror actuator of claim 2, further comprising a slit formed at a predetermined portion of the reflecting unit of the micromirror.

4. The micromirror actuator of claim 2, wherein the at least one electrode is formed at at least one of a bottom and a sidewall of the trench.

5. The micromirror actuator of claim 2, wherein in the micromirror, the driving unit and the reflecting unit are formed to be asymmetrical and a length of the driving unit is smaller than a length of the reflecting unit.

6. The micromirror actuator of claim 5, wherein in the micromirror, a width of the driving unit is greater than a width of the reflecting unit.

7. The micromirror actuator of claim 1, further comprising a slit formed at a predetermined portion of the reflecting unit of the micromirror.

8. The micromirror actuator of claim 1, wherein the at least one electrode is formed at at least one of a bottom and a sidewall of the trench.

9. The micromirror actuator of claim 1, wherein in the micromirror, the driving unit and the reflecting unit are formed to be asymmetrical and a length of the driving unit is smaller than a length of the reflecting unit.

10. The micromirror actuator of claim 9, wherein in the micromirror, a width of the driving unit is greater than a width of the reflecting unit.

11. A method of manufacturing a micromirror actuator, comprising:

forming a trench pattern in a substrate;

forming a lower electrode and a side electrode in the trench pattern and forming a shielding electrode on a surface of the substrate outside the trench pattern by sequentially depositing an insulating layer and a metal layer on the substrate and etching the metal layer;

depositing a sacrificial layer to a predetermined thickness on the surface of the substrate including the trench pattern;

forming holes for supporting posts by etching a predetermined portion of the sacrificial layer;

depositing a further metal layer on the sacrificial layer and patterning the further metal layer into a micromirror, a torsion bar, and supporting posts; and forming the micromirror, the torsion bar, and the supporting posts by removing the sacrificial layer.

12. The method of claim 11, wherein in the step of depositing the sacrificial layer, a photoresist is deposited on the substrate and then is planarized by chemical mechanical polishing.

13. The method of claim 11, wherein the step of depositing the sacrificial layer comprises:

forming a photoresist pattern having a width greater than the trench pattern by depositing a first photoresist on the substrate and etching the first photoresist;

flowing and hard-baking the photoresist pattern at a high temperature;

thinly ashing the photoresist pattern; and depositing a second photoresist to a predetermined thickness on the substrate including the photoresist pattern.

14. The method of claim 11, wherein the step of depositing the sacrificial layer comprises laminating a film type organic layer on the substrate so as to make the trench pattern hollow.

15. The method of claim 14, wherein the step of patterning the further metal layer comprises forming an electrostatic force prevention slit at a predetermined portion of the micromirror by an etching process.

16. The method of claim 12, wherein the step of patterning the further metal layer comprises forming an electrostatic force prevention slit at a predetermined portion of the micromirror by an etching process.

17. The method of claim 11, wherein the step of patterning the further metal layer comprises forming an electrostatic force prevention slit at a predetermined portion of the micromirror by an etching process.

* * * * *